United States Patent [19]
Ellis et al.

[11] 3,974,537
[45] Aug. 17, 1976

[54] LIP EXTENDER FOR LOADING DOCK LEVELERS

[75] Inventors: Lawrence D. Ellis; Robert E. Evans, both of South El Monte, Calif.

[73] Assignee: Ellis Industries, Inc., South El Monte, Calif.

[22] Filed: May 15, 1975

[21] Appl. No.: 577,754

[52] U.S. Cl. ............................................... 14/71.3
[51] Int. Cl.² ........................................ B65G 11/00
[58] Field of Search ..................... 14/71 M, 36, 37

[56] References Cited
UNITED STATES PATENTS

| | | | |
|---|---|---|---|
| 3,327,335 | 6/1967 | Beckwith | 14/71 |
| 3,460,175 | 8/1969 | Beckwith | 14/71 |
| 3,493,984 | 2/1970 | Reinhard | 14/71 |
| 3,584,324 | 6/1971 | Merrick | 14/71 |
| 3,662,416 | 5/1972 | Brooks | 14/71 |
| 3,685,077 | 8/1972 | Wiener | 14/71 |
| 3,728,753 | 4/1973 | Beckwith | 14/71 |

Primary Examiner—Nile C. Byers
Attorney, Agent, or Firm—Robert C. Comstock

[57] ABSTRACT

A lip extender for use with a loading dock leveler. The lip extender includes a lower link connected at its lower end to the base plate of the leveler and a toggle arm connected at its upper end beneath the lip. The opposite ends of the toggle arm and lower link are pivotally connected together. Upward movement of the hinge connection between the bridge plate and lip moves them both upwardly to a cocked position in which they are supported by the toggle arm and lower link, which pivot into an over-center position. Downward force exerted on the upper part of the bridge plate causes a cam follower carried by the pivotal connection between the toggle arm and lower link to engage a cam surface mounted beneath the bridge plate. The lip is thereby extended simultaneously upwardly and outwardly over the rear edge of a truck disposed adjacent to the dock. When the lip reaches its fully extended position, the toggle arm moves past the center position and allows the lip to drop onto the truck bed.

6 Claims, 6 Drawing Figures

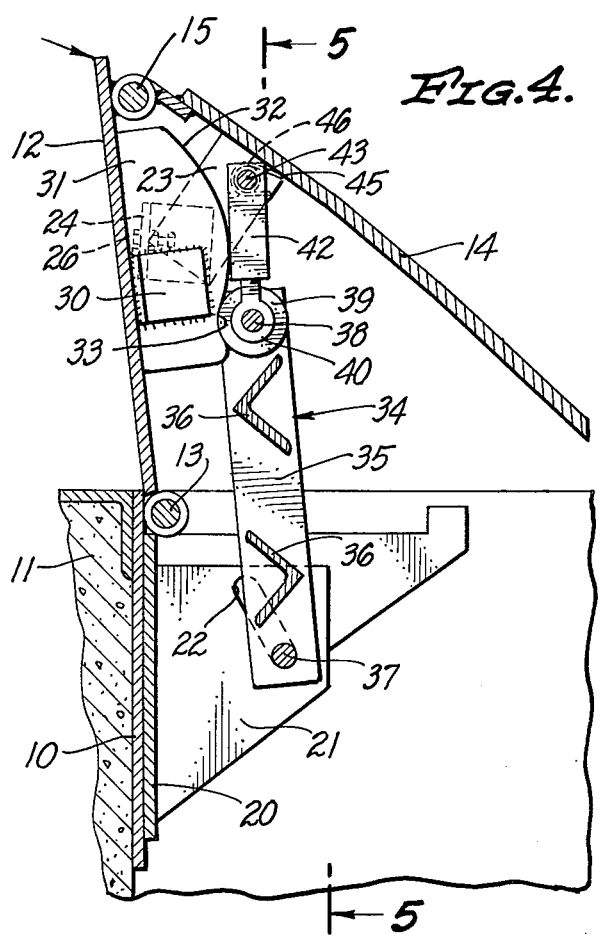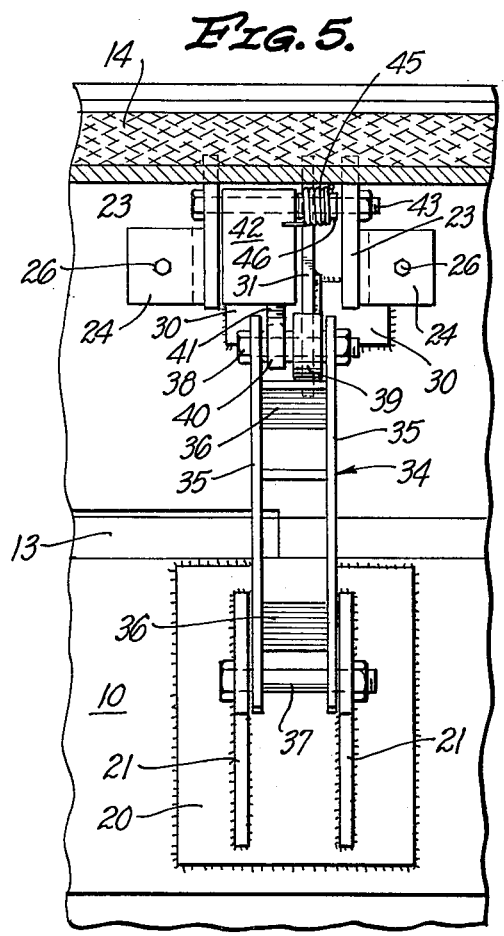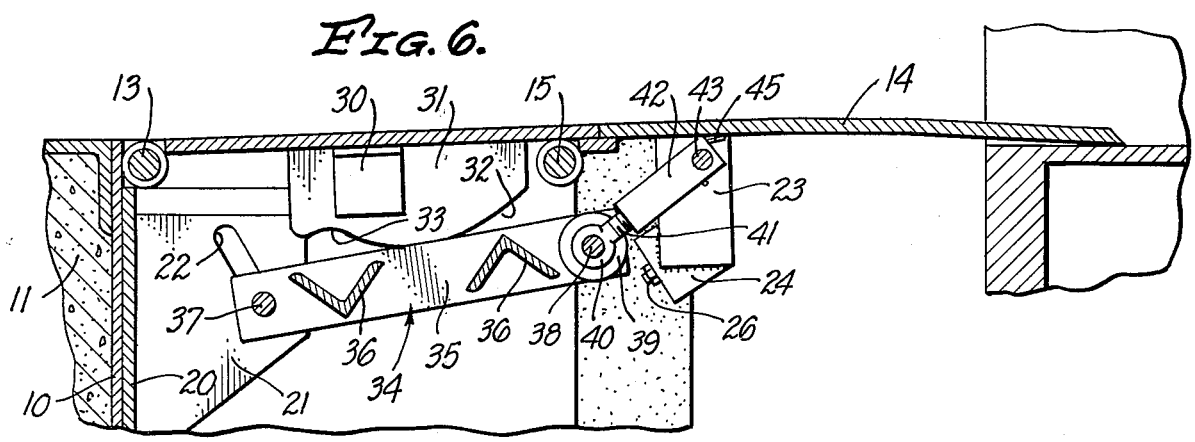

LIP EXTENDER FOR LOADING DOCK LEVELERS

BACKGROUND OF THE INVENTION

1. Field of the Invention

The invention relates to a device for extending the lip of a loading dock leveler for movement of the lip into the rear of a truck disposed adjacent to the dock.

2. Description of the Prior Art

Dock levelers of the type now in use comprise a vertically directed base plate which is permanently attached to the dock, a bridge plate which is pivotally attached along one edge thereof to the upper edge of the base plate, and a lip which is pivotally attached to the opposite edge of the bridge plate. Almost all dock levelers include some type of spring device which assists the operator in lifting the bridge plate, but these devices are of little or no help in lifting the lip and moving it into a horizontal position overlying the rear edge of the truck.

At the present time, it is necessary for the operator to bend over the edge of the dock, catch the bottom edge of the lip with a hook or chain device and then lift the lip and swing it out into a horizontal position. Since the operator is bending over the edge of the dock, there is no firm support directly beneath him. The operation requires a substantial amount of bending and twisting of the back, frequently resulting in back injuries which are harmful to the operator and costly to the employer.

There is no device in use at the present time which gives substantial assistance in lifting the lip and/or in extending the lip to its operating position.

SUMMARY OF THE INVENTION

It is a primary object of the present invention to provide a lip extender for loading dock levelers which eliminates the necessity for the operator to lift the lip separately from the bridge plate lifting operation and which thereafter automatically extends the lip into its operating position without any lifting or bending action by the operator.

In essence, the invention contemplates a lip extending device which automatically moves into operating position when the bridge plate pintle pin is lifted in a conventional manner. The device lifts the lip into an elevated angular position with respect to the bridge plate and holds it securely in such position. Downward force exerted upon the bridge plate by the foot of the operator causes the lip to be moved automatically into a horizontal position overlying the rear edge of the truck simultaneously with movement of the bridge plate into a horizontal position. When the leveler is horizontally overlying the rear of the truck, the lip extender mechanism automatically allows the leveler to drop onto the truck bed.

The device preferably includes a cam for automatically moving the outer edge of the lip upwardly simultaneously with its outward movement so as to clear the rear edge of the truck without any lifting of the lip by the operator.

The device is preferably adjustable to vary the lip movement as required for various types of trucks and dock levelers.

Another object is to provide a safer means of using the dock leveler by having the operator place the leveler in use from a position standing back on the dock instead of bending out over the edge of the dock.

It is accordingly among the objects of the invention to provide a lip extender for loading dock levelers having all of the advantages and benefits of the invention set forth above and described in further detail hereinafter in this specification.

Another object of the invention is to provide such a device which is simple and economical in its construction and operation.

Still another object of the invention is to provide such a device which can serve a secondary purpose of providing a block to prevent rolling stock from accidentally falling off the edge of the dock.

It is a further object of the invention to provide a device of the type described which is adapted to be attached to and used with substantially every edge-of-dock type dock leveler which is now in use.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 4 is a similar sectional view showing the mechanism in cocked position;

FIG. 5 is a sectional view taken on line 5—5 of FIG. 4;

FIG. 6 is a sectional view similar to FIGS. 3 and 4, showing the dock leveler in extended position with the lip bridging the area between the dock and the rear of the truck.

DESCRIPTION OF THE PREFERRED EMBODIMENT

Figure 1:
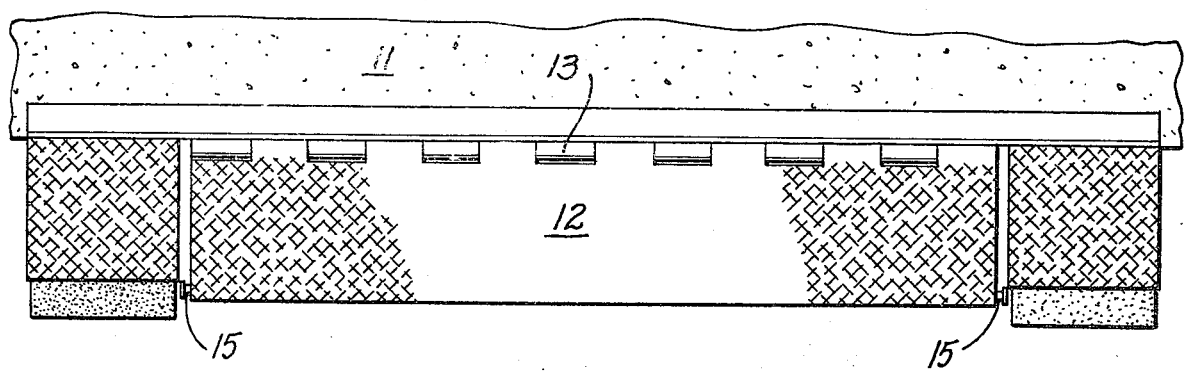
FIG. 1 is a top plan view of a dock leveler in normal out of use position.
Figure 2:
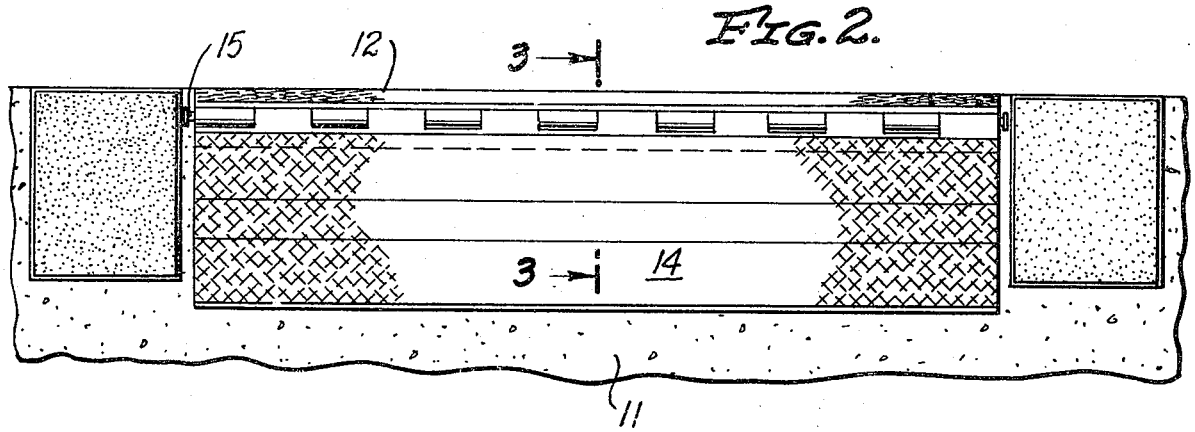
FIG. 2 is a front elevational view of the same.
Figure 3:
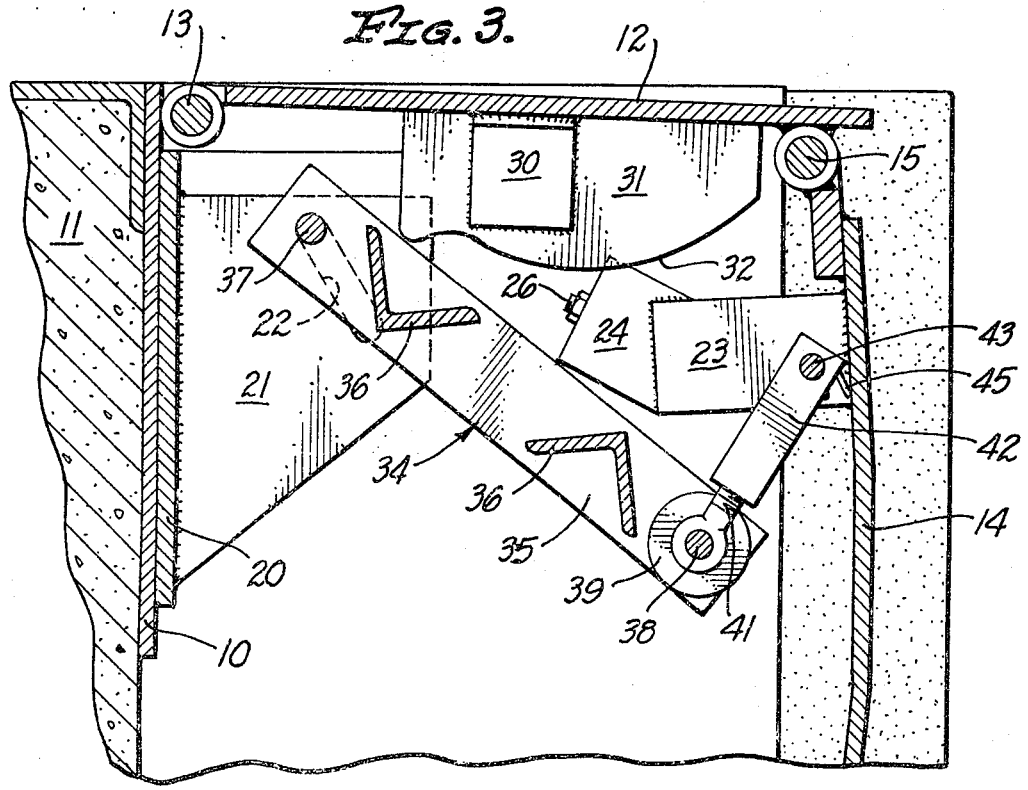
FIG. 3 is a sectional view taken on line 3—3 of FIG. 2, showing the structure of the present invention.

The preferred embodiment of the invention is adapted for use with substantially any edge-of-dock type dock leveler now in use. For purposes of illustration, one type of conventional dock leveler is shown in the drawings, but the device is capable of being connected to and functioning with substantially all other types of dock levelers as well.

The conventional dock leveler structure includes a vertically directed base plate 10, which is permanently fixed to the dock 11 and which extends downwardly from the upper edge of the dock 11. A bridge plate 12, which normally extends horizontally outwardly from the dock 11, is pivotally connected along one edge thereof to the upper edge of the base plate 10 by a hinge 13.

The opposite edge of the bridge plate 12 is pivotally connected to one edge of a lip 14, which normally hangs vertically downwardly from the outer edge of the bridge plate 12. The pivot connection between the bridge plate 12 and lip 14 comprises hinge means which includes a pintle pin 15. The pintle pin 15 preferably extends outwardly beyond one or both side edges of the bridge plate 12 and lip 14 to provide a protuberance which can be caught by the end of an elongated hook held by an operator for lifting purposes.

The conventional dock leveler structure includes spring means which urges the bridge plate 12 upwardly as the pintle pin 15 is lifted by the hook of the operator. Different types of spring means are used in various levelers, but they all serve the same function.

The structure of the present invention comprises a square lower plate 20 which is welded or otherwise secured to the base plate 10 of the dock leveler. A pair of spaced parallel side plates 21 are welded or otherwise secured along one of their edges to the lower plate 20. Each of the side plates 21 has an elongated slot 22 formed therein.

An upper plate assembly is welded or otherwise secured to the lower side of the lip 14 directly above the pintle pin 15. The upper plate assembly includes a pair of outwardly projecting side members 23, to each of which is welded an angle iron clip 24 which is disposed at an angle with respect to the side member 23 to which it is secured.

The clips 24 have threaded openings in the center of the portions thereof which extend outwardly from the side members 23. A bolt 26 is threadedly mounted in each of the openings for adjustment purposes. The ends of the bolts 26 are constructed and arranged to engage the under side of the bridge plate 12 when the mechanism is in cocked position. The bolts 26 are threadably adjustable to control their length and thereby control the angular projection of the lip 14 as described hereinafter.

Mounted on the under side of the bridge plate 12 adjacent to the pintle pin 15 is a cam plate assembly which comprises a pair of angle iron side plates 30 which are welded or otherwise connected to the bridge plate 12 and to the opposite sides of a cam plate 31. The cam plate 31 extends transversely with respect to the bridge plate 12 and its outer edge comprises a curved cam surface 32 having at the lower end thereof an inwardly curved pocket or recess 33.

A lower link assembly comprises a lower link 34 having a pair of sides 35 between which extend a pair of spaced angle iron reinforcements 36. Extending between the sides 35 at the lower end of the link 34 is a pivot pin 37. The pivot pin 37 extends through and is both pivotally and slidably mounted in the slots 22 of the side plates 21.

Extending between the sides 35 at the upper end of the lower link 34 is a bolt 38. A cam follower 39 is rotatably mounted on the bolt 38. The cam follower 39 is adapted to engage and follow the cam surface 32. Also rotatably mounted on the bolt 38 is a spherical rod end 40, the rod portion 41 of which is threadedly connected to the lower part of a toggle arm 42.

The upper end of the toggle arm 42 is rotatably journaled on a shaft 43 which extends across the upper part of the upper plate assembly, extending through the side members 23.

A torsion spring 45 concentrically surrounds an arbor sleeve 46 mounted on the shaft 43. One end of the spring 45 engages the toggle arm 42 and the other end engages an under side of the lip 14.

When the dock leveler is aligned in its normal out of use position, the bridge plate 12 extends horizontally and the lip 14 extends downwardly in vertical position. Upon lifting movement exerted by the operator on the end of the pintle pin 15 with a hook or the like, the bridge plate 12 is pivoted upwardly on its hinge 13, carrying the lip 14 along with it.

Upward movement of the lip 14 causes the lower link 34 to pivot rearwardly toward the dock 11, pivoting on the pivot pin 37. At the same time, the toggle arm 42 also pivots rearwardly toward the dock 11, pivoting on the shaft 43.

When the bridge plate 12 approaches a substantially vertical position, lower link 34 and toggle arm 42 also reach substantially vertical aligned positions. Further upward movement of the pintle pin 15 causes the lower link 34 and toggle arm 42 to move to an over-center position in which they are inclined slightly toward the dock 11. The torsion spring 45 exerts pressure upon the toggle arm 42 to assure its movement into an over-center position.

The device in now in what may be termed a cocked position, as shown in FIGS. 4 and 5 of the drawings. Movement beyond this position is prevented by engagement between the ends of the bolts 26 and the under side of the bridge plate 12 and by engagement between the cam follower 39 and the cam surface 32. In this position, the cam follower 39 is disposed within the recess 33 on the lower part of the cam surface 32.

The dock leveler is now in position for movement of the lip 14 into the rear of the truck. This is accomplished by exerting downward and outward pressure on the upper portion of the bridge plate 12 in the area adjacent to the pintle pin 15. This may conveniently be done by the foot of the operator.

As pressure is exerted against the upper portion of the bridge plate 12, the bridge plate 12 pivots forwardly, away from the dock 11. As the bridge plate 12 moves forwardly it causes the cam surface 32 to move downwardly with respect to the cam follower 39. As the cam follower 39 moves upwardly with respect to the cam surface 32, it also moves outwardly due to the curvature of the cam surface 32. Upward and outward movement of the cam follower 39 is transmitted through the rod portion 41 to the shaft 43, causing simultaneous upward and outward movement of the outer edge of the lip 14.

This upward and outward movement of the outer edge of the lip 14 continues until the cam follower 39 approaches the upper end of the cam surface 32, at which time the toggle arm 42 and lower link 34 are moved out of their over-center position. They accordingly no longer support the bridge plate 12 and lip 14, which move to a horizontal position by force of gravity. (FIG. 6)

In use, the truck which is disposed adjacent to the dock has a flat horizontal cargo carrying bed which is on a level with or disposed somewhat above or below the level of the dock. The rear of the truck extends vertically downwardly from a cargo carrying bed and is disposed only a short distance outwardly from the edge of the dock. The lip 14 is disposed vertically between the dock and the rear of the truck.

In using the dock leveler, it is necessary first to move the lip upwardly in such a manner that it will clear the rear of the truck. The lip 14 must then be moved upwardly a sufficient distance to clear the rear edge of the bed of the truck as the lip is moved into it. The bed of the truck may be disposed above the level of the dock or may have an elevated portion which is so disposed. The device is preferably constructed and arranged so that the outer edge of the lip is capable of clearing a truck disposed approximately 6 inches above the level of the dock.

The device is provided with adjusting means for achieving the best movement of the lip. The lip adjusting bolts 26 control the distance between the outer edge of the lip 14 and the rear of the truck when the leveler is being moved into its cocked position. They may also be adjusted to provide maximum upward movement of the lip for maximum clearance over the truck bed. The rod portion 41 is adjustable with respect to the upper plate 17 to control the height of the outer edge of the lip 14 when the toggle arm 42 and lower link 34 move into and out of over-center position.

When the truck is loaded, it can be driven away from beneath the lip 14, which will drop down into its vertical out of use position. The lip 14 and bridge plate 12 may also be removed from the truck by reverse movement of that described above.

The slots 22 formed in the side plates 21 serve several purposes. When the device is in use, they permit a limited amount of movement of the bottom end of the lower link 34 toward the dock 11, to permit the outer edge of the lip 14 to move past the rear of the truck. When the device is not in use, they permit limited movement of the lip 14 toward the dock 11 in the event that it is hit by the rear of the truck. This prevents or limits possible damage to the lip extender mechanism.

When the device is in cocked position, as shown in FIG. 4 of the drawings, it can be left in such elevated cocked position and used as a block to prevent the accidental movement of rolling stock and/or personnel off the edge of the dock.

While the device has been shown and described with the use of a cam surface and cam follower to elevate the outer edge of the lip beyond its cocked position, it should be understood that the device is also capable of use without a cam surface and cam follower.

While the term "lower link" has been used to designate the lower link or toggle member and the term "toggle arm" has been used to designate the upper link or toggle member, it should be understood that such terms are not limiting and that any suitable pair of link or toggle members may be used which accomplishes the results shown and described.

We claim:

1. A lip extender for use with a loading dock leveler of the type having a vertically directed base plate, a bridge plate pivotally connected to said base plate and a lip pivotally mounted along its inner edge to the outer edge of the bridge plate, said lip extender comprising a lower link pivotally connected at its lower end to said base plate, a toggle arm pivotally connected at its upper end beneath said lip, the opposite ends of said lower link and toggle arm being constructed and arranged so that upon lifting of said bridge plate, the pivotally connected ends of said lower link and toggle arm move into an over-center locking engagement with each other to hold said bridge plate and lip in an elevated position, and a cam mounted beneath said bridge plate, said cam having a cam surface, a cam follower carried by the pivotal connection between said toggle arm and said lower link, said cam follower being adapted to pivot the outer edge of said lip simultaneously upwardly and outwardly as said cam follower is moved upwardly with respect to said cam surface by downward movement of said bridge plate toward a horizontal position, thereby moving the outer edge of said lip over the rear edge of a truck disposed adjacent to the dock leveler without direct lifting movement of the outer edge of said lip.

2. The structure described in claim 1, and means for adjusting the length of at least one of said toggle arm and lower link members to assure the over-center locking movement of said toggle arm and lower link.

3. The structure described in claim 2, and means for adjusting the distance between said toggle arm and said bridge plate when said toggle arm is in locking engagement with said lower link.

4. The structure described in claim 1, the pivotal connection of the lower end of said lower link and said base plate comprising pin and slot means, with said pin being movable along said slot.

5. The structure described in claim 1, and resilient means urging said toggle arm and lower link member into said over-center relationship upon the lifting of said bridge plate.

6. The structure described in claim 5, said resilient means urging said cam follower into engagement with said cam surface.

* * * * *